May 13, 1958 S. FEINSTEIN 2,834,881
AMPLIFIER AND POWER SUPPLY THEREFOR
Filed Dec. 10, 1953
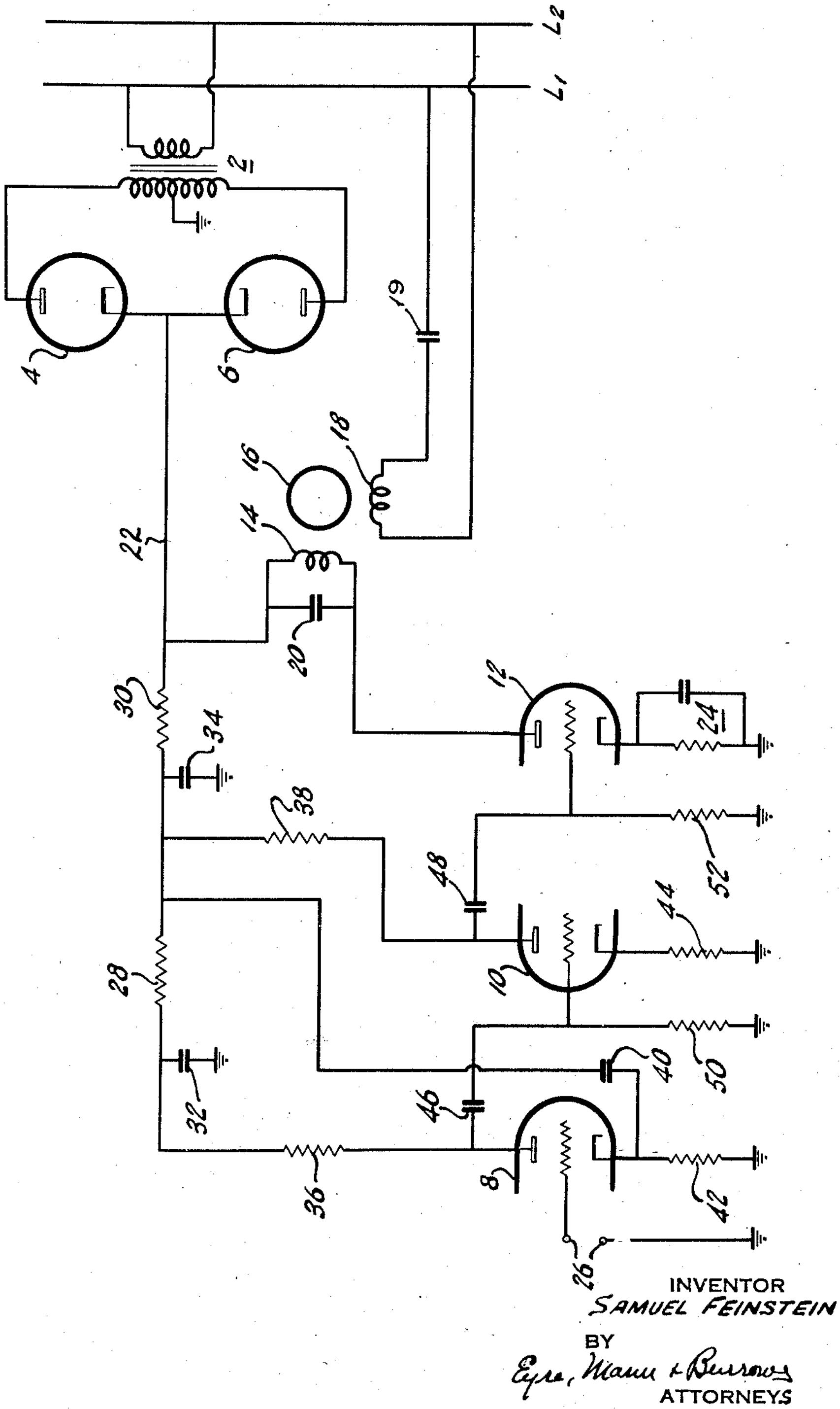
INVENTOR
SAMUEL FEINSTEIN
BY
Eyre, Mann & Burrows
ATTORNEYS United States Patent Office 2,834,881

Patented May 13, 1958

2,834,881

AMPLIFIER AND POWER SUPPLY THEREFOR

Samuel Feinstein, Wantagh, N.Y., assignor to Servomechanisms Inc., a corporation of New York Application December 10, 1953, Serial No. 397,408

3 Claims. (Cl. 250—27)

The present invention relates to amplifiers and more particularly to high gain amplifiers of the type employed to power servo control motors for computer applications or the like and comprises a novel amplifier and power supply therefor that is highly efficient, requires a minimum of bulky components and has low power requirements.

The constantly increasing use of electronic controls in industry in general and in aircraft in particular, has correspondingly increased the need for smaller and lighter weight electronic equipment. The present invention meets this need by providing an amplifier which requires substantially less space than the smallest servo amplifier of conventional constructions now in use and a power supply which is likewise smaller than conventional power supplies. A conventional amplifier may comprise two stages of voltage amplification, a phase inverter and driver stage and a push-pull output power stage. A conventional power supply for such amplifier may comprise a full wave rectifier, a filter and one or more decoupling networks, operating energy for the power stage being taken from the filter output terminal and for the voltage amplifiers from the output terminal of the decoupling networks. The power supply must deliver substantial direct current to the power stage. As compared to this prior art arrangement, the amplifier of the present invention includes a series circuit of a single power amplifier tube and the load (e. g. control winding of a servo motor) tuned for parallel resonance at the frequency of the supply voltage, to which circuit is applied the unfiltered output of a full wave rectifier. Preceding driver and voltage amplifier stages are supplied from the rectifier through simple decoupling networks. In phase or out of phase signals on the grid of the power amplifier determines which of the two half wave pulses from the full wave recitifier is permitted to appear in larger magnitude across the load. A negative feedback connection insures that the second harmonic across the load for zero input signal will be a minimum. With the above briefly described circuit, a single power winding is sufficient for operation of any quantity of amplifiers and several amplifiers, if desired, can be connected in parallel to a single full wave rectifier. The circuit requires no output or driver transformers, no chokes and no large filter capacities. Its efficiency is high and power requirements extremely low.

For a better understanding of the invention and of a specific circuit embodying the same, reference may be had to the accompanying drawing of which the single figure is a circuit diagram of an amplifier and power supply embodying the invention.

The power supply portion of the system shown in the drawing comprises a power transformer 2 having a primary winding and a center grounded secondary winding and a full wave rectifier consisting of diodes 4 and 6 the cathodes of which are tied together and the anodes of which are connected to opposite ends of the transformer secondary. The primary winding of transformer 2 is connected across power lines $L_1$, $L_2$ which may be, for example, 60 cycle 115 volt supply lines. The amplifier portion of the system includes three electronic tubes 8, 10 and 12, shown as simple triodes. Tubes 8 and 10 serve as the voltage amplifier and driver stage of the amplifier and tube 12 as the power stage. The control winding 14 of a servomotor, the rotor of which is indicated diagrammatically at 16 and the power winding at 18, is bridged by a condenser 20 of such capacity as to provide with the winding a circuit tuned for parallel resonance at the frequency of the supply lines $L_1$, $L_2$. The power winding 18 is connected in series with a capacitor 19 across the lines $L_1$, $L_2$. The tuned circuit including the control winding 14 is connected between the anode of the power tube 12 and the high voltage line 22 leading from the cathodes of the full wave rectifier of the power supply. The cathode of the power tube 12 is connected to ground through an RC circuit 24 so that the power tube 12 and parallel tuned motor winding circuit are effectively connected in series across the high voltage circuit.

Amplifier input terminals, of which one is grounded and the other connected to the grid of tube 8 are indicated by the reference numeral 26. B+ is provided for the tubes 8 and 10 from the line 22 through simple decoupling networks comprising series connected resistors 28 and 30 and condensers 32 and 34 connected between the low voltage ends of the resistors 28 and 30, respectively, and ground, a potential dropping resistor 36 being provided for the anode of tube 8 and a potential dropping resistor 38 being provided for the anode of tube 10. To minimize the amount of the second harmonic existing across the motor for zero input signal, a feedback connection, including a capacity 40, is provided between the junction of resistors 28 and 30 and the cathode of tube 8. The cathodes of tubes 8 and 10 are connected to ground through resistors 42 and 44 respectively. The anode of tube 8 is connected to the control grid of tube 10 through a condenser 46 and similarly the anode of tube 10 is connected to the control grid of the power tube 12 through a condenser 48. Grid return resistors 50 and 52 are provided for the control grids of tubes 10 and 12.

With the above described circuit, assuming 60 cycle power lines, the rectifier output can be considered as comprising a unidirectional component and a 120 cycle component. When no signal is impressed on the control grid of the power tube 12, neither component will produce torque in the motor. Heating of the motor by the 120 cycle current is minimized because the feedback connection through capacitor 40 to the cathode of tube 8 produces pulses of the proper phase to decrease the grid potential of tube 12 during the positive half wave of the 120 cycle component and to increase the control grid potential of tube 12 during the negative half wave of the 120 cycle component thereby tending to maintain constant and very small the current through the motor winding. When an alternating signal of the frequency of the supply voltage is impressed across terminals 26, the signal will be amplified and impressed in the same phase on the grid of the power tube. If the signal is in phase or 180° out of phase with the voltage impressed upon the rectifier, it will cause the current through the power tube to increase during one half wave pulse and to decrease during the other half wave pulse, thus producing a 60 cycle component the phase of which determines the direction of rotation of the motor. A relatively high voltage will appear across the motor winding because of the high impedance offered by the parallel tuned circuit to current of the fundamental frequency.

Other amplifier units could be connected to the line 22 for operation from the same full wave rectifier and power transformer. Preferably, however, the full wave rectifier is packaged together with the other components of the amplifier in a single unit so that all parts of the circuit that include electronic tubes can be hermetically sealed by immersion in a suitable insulating fluid as, for instance, silicone fluid. In such case, the power supply comprises solely the power transformer which can power a number of amplifier units each including a full wave rectifier.

In one physical embodiment of the invention now in commercial use, miniature and subminiature electronic tubes are employed. Tube 8 is one-half of a 6112 connected for operation as a triode, tubes 10 and 12 are halves of a 5687 and the full wave rectifier comprises two subminiature diodes, specifically two 5641 tubes. These tubes, together with the decoupling networks, potential dropping and grid biasing resistors, feedback and coupling capacitors are packaged in a unit which is 1½" by 2" by 4". The separately packaged power transformer which, in this particular commercial system powers seven amplifier units, requires less space than power supplies heretofore used and not over three amplifier units.

The invention has now been described with reference to a single embodiment thereof. Obviously, various changes in the particular details of the illustrated circuit could be made without departing from the spirit of the invention or the scope of the accompanying claims.

The following is claimed:

1. The combination with a source of alternating voltage and load circuit tuned for parallel resonance at the frequency of the source, of an amplifier and power supply therefor for controlling the load in response to an alternating current control signal of the frequency of the source comprising an amplifier stage, including a voltage amplifier tube and a driver tube, for amplifying the input signal, a power stage coupled to said amplifier stage and including a power tube having an anode connected to one end of said tuned load circuit, and a power transformer having a primary connected across said source and a center grounded secondary, a full wave rectifier for rectifying the voltage across said secondary and impressing unfiltered rectified voltage across said load circuit and power tube in series and two decoupling networks for delivering operating energy from said rectifier to said amplifier stage, said voltage amplifier tube being connected for receipt of operating energy through both said networks and said driver tube receiving operating energy through one decoupling network, and a feedback connection from the output end of said last mentioned network to an electrode of said amplifier tube phased to minimize current through the load circuit of twice the frequency of the source.

2. The combination with a source of alternating voltage of a power transformer having a primary winding connected across said source and a center tapped secondary winding, at least one full wave rectifier having input terminals connected across said secondary winding and an output terminal for high pulsating direct voltage connected through at least two parallel circuits to the center tap of said secondary winding, a power tube and an amplifier tube each having an anode, a control grid and a cathode, one of said parallel circuits comprising a load tuned for parallel resonance at the frequency of said source, said power tube and a cathode impedance all connected in series, the load being connected between the anode of the power tube and said rectifier output terminal, the other of said parallel circuits comprising a decoupling network, a dropping resistor, said amplifier tube and a cathode impedance all connected in series, one end of each of said cathode impedances being connected to said center tap of said secondary winding, and a coupling between the anode of said amplifier tube and the control grid of said power tube whereby the current through said load may be controlled in response to a signal of the frequency of said source impressed upon the control grid of said amplifier tube, said second parallel circuit including a branch circuit connected at one end to the junction of said decoupling network and said dropping resistor and at the other end to the center tap of said secondary winding, said branch circuit including a second decoupling network, a second dropping resistor, a second amplifier tube and a second cathode impedance all connected in series, the anode of said second amplifier tube being coupled to the control grid of said first amplifier tube whereby a signal of the frequency of said source when impressed upon the control grid of said second amplifier tube is amplified thereby and impressed upon the control grid of said first amplifier tube.

3. The combination according to claim 2 including a capacitative connection between the junction of said decoupling networks and the cathode of said second amplifier for providing a pulsating bias for said first amplifier tube.

References Cited in the file of this patent

UNITED STATES PATENTS

| | | |
|---|---|---|
| 1,942,551 | Hentschel | Jan. 4, 1934 |
| 2,172,064 | Harrison | Sept. 5, 1939 |
| 2,440,600 | Crosby | Apr. 27, 1948 |
| 2,525,466 | Wald | Oct. 10, 1950 |
| 2,544,790 | Hornfeck | Mar. 13, 1951 |
| 2,605,451 | Ward et al. | July 29, 1952 |
| 2,676,291 | Perkins et al. | Apr. 20, 1954 |